(12) United States Patent  (10) Patent No.: US 8,566,745 B2
Bartolini et al.  (45) Date of Patent: Oct. 22, 2013

(54) METHOD AND SYSTEM FOR PROJECT AND PORTFOLIO MANAGEMENT

(75) Inventors: Claudio Bartolini, Palo Alto, CA (US); Rosalynn J. Tuggle, Austin, TX (US); Jason Waugh, Chicago, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 287 days.

(21) Appl. No.: 12/916,442

(22) Filed: Oct. 29, 2010

(65) Prior Publication Data

US 2012/0110504 A1    May 3, 2012

(51) Int. Cl.
*G06F 13/00*  (2006.01)
*G06F 15/00*  (2006.01)

(52) U.S. Cl.
USPC ............................ 715/810; 715/765; 715/851

(58) Field of Classification Search
USPC ................. 715/762–765, 810, 851, 855, 840; 717/123, 124
See application file for complete search history.

(56) References Cited

U.S. PATENT DOCUMENTS

| | | | |
|---|---|---|---|
| 7,552,078 B2 | 6/2009 | Flaxer et al. | |
| 7,853,508 B2 * | 12/2010 | Scumniotales et al. | 705/36 R |
| 2003/0023533 A1 | 1/2003 | Tan | |
| 2003/0208429 A1 | 11/2003 | Bennet | |
| 2004/0199445 A1 * | 10/2004 | Eder | 705/35 |
| 2004/0230506 A1 | 11/2004 | Casco-Arias et al. | |
| 2005/0137920 A1 | 6/2005 | O'Connor et al. | |
| 2008/0133259 A1 * | 6/2008 | O'Connor et al. | 705/1 |
| 2009/0254399 A1 * | 10/2009 | Cristol | 705/8 |
| 2011/0145657 A1 * | 6/2011 | Bishop et al. | 714/47.1 |

\* cited by examiner

*Primary Examiner* — Cao "Kevin" Nguyen

(57) ABSTRACT

A method and system for project and portfolio management is disclosed. The method may include tagging one or more data records of projects of a plurality of projects with one or more tags, and displaying on a display device the one or more tagged data records with information relating to said one or more tags. A computer program product is also disclosed.

18 Claims, 5 Drawing Sheets

METHOD AND SYSTEM FOR PROJECT AND PORTFOLIO MANAGEMENT

BACKGROUND

Information Technology (IT) project and portfolio management (PPM) may define and validate portfolios of IT investments from a business perspective. IT managers and executives may have objectives that may include purely financial measures, for example, return on investments, limited costs, profitability, and growth of return. Other objectives may include, strategic initiatives, market expansions and responding to customer demands.

When making portfolio selection decisions, the preferences and objectives of multiple stakeholders may be taken into account. Moreover, there are constraints on the feasible allocation of budget and staffing resources to projects that may be considered.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. It should be noted that the figures are given as examples only and in no way limit the scope of the invention. Like components are denoted by like reference numerals.

DETAILED DESCRIPTION

Figures 1, 2:
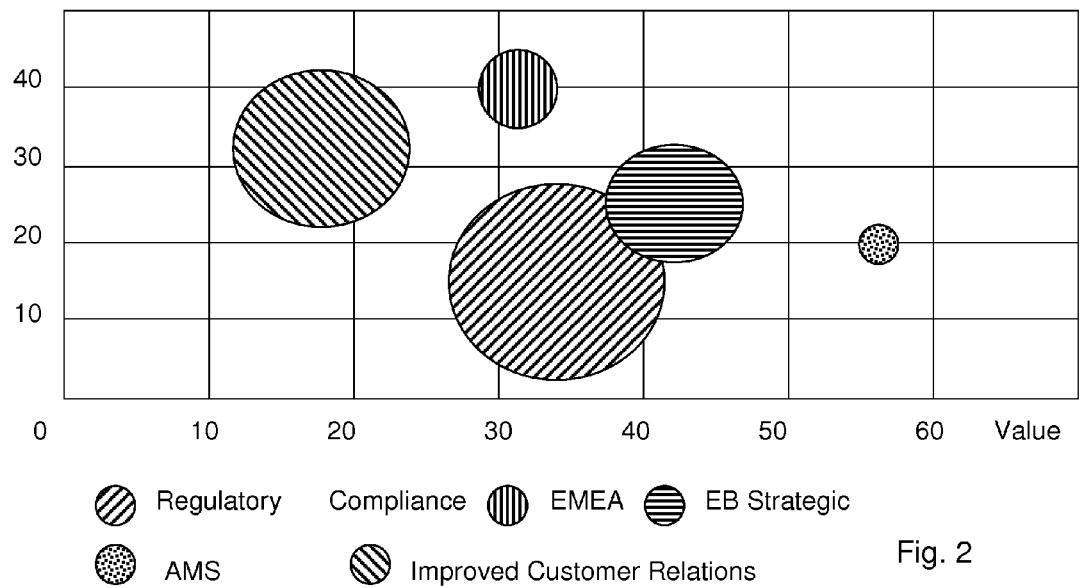
FIG. 1 illustrates a graphical user interface (GUI) in accordance with an embodiment of the invention.
FIG. 2 illustrates a GUI, in accordance with an embodiment of the invention.

A method and system for IT project and portfolio management in accordance with respective embodiments of the invention may facilitate investment planning in a hierarchical structure (e.g. strategic program, geographical, and organizational hierarchy), a new mechanism is described herein, which may facilitate the proposing of an investment scenario for a child portfolio up to the parent portfolio, where the scenario can be considered with other higher-level investment proposals, and for divvying up funding decisions from top down through the child portfolios.

According to embodiments of the invention a system, method and computer program media may allow IT portfolio managers at different hierarchial levels in an organization to plan an investment strategy, while facilitating constraints to be entered and respected across all organizational levels, and cross-portfolio programs.

Existing and prospective projects to be added to a portfolio may be tagged. The relationships resulting from the tagging may be used for monitoring and for resource allocation purposes.

A portfolio selection project in large companies may involve hundreds of budgeting and staffing decisions for existing and prospective projects. This may easily result in sub-optimal allocation due to the lack of visibility into the relationships between projects that get funded. For example, while trying to make sure that budget constraints over a set of projects belonging to a given program are respected, one might overlook staffing constraints over projects that are geography related.

Commercially available PPM software applications may have a pre-defined way of creating relationships between current or prospective projects by creation of pre-defined hierarchies, for example, "strategic initiative", "program" and "project". A "strategic initiative" may be composed of one or more "programs", which in turn may be composed of one or more projects.

According to an embodiment of the invention, flexible relationships may be created between current and prospective projects by "tagging" projects. Projects may have multiple tags. Tags can be attached to projects as a flexible way of denoting that a project is, for example, part of a strategic initiative, part of a wider program, or is located in a certain geographical location. The tagging of projects may be useful for reporting purposes (e.g. monitoring), and for resource allocation purposes.

According to an embodiment of the invention a GUI may be presented to a user. The GUI may include project details, and may include one or more tags which were assigned by that user and/or by one or more other users. The user may be provided with an option to create a new tag e.g. by actuating an "add project tag" button. The GUI application may be provided with an autocomplete function that when triggered presents a list of possible completion to a tag based on previous tagging of other projects.

Users may provide their own favorite semantics to the set of tags. For example, when tagging a set of projects, some tags may relate to a geographical location (e.g., EMEA—for Europe, Middle East, Africa, AMS—for Americas), while some may relate to strategic initiatives (e.g. Enterprise Business strategic) or programs (e.g., SAP). Tagging may also include other invariable features of a project (e.g. "project manager").

Tagging may be useful in reporting on a project. Multiple views may be made available to a user based on one or more selected tags. Monitoring project measures across programs and strategic initiatives may add a degree of freedom, because tags may represent the containment hierarchy used in PPM and may allow for flexible clustering of related projects. A project may be tagged with one or more tags. For example, a project may be tagged with a "business objective" tag (e.g., "regulatory compliance"), while at the same time it may be tagged with a "geographical" tag (e.g., "Americas").

Tagging may facilitate a better informed portfolio selection process. A user may select projects to be part of a portfolio, while monitoring the aggregate value of constrained measures (e.g., total budget, and/or total staffing levels) for a given tag. This may allow stakeholders to preventively agree on constraints over such measures for a given tag.

Tagging projects may allow flexibility in reporting and in portfolio selection. By tagging, IT managers and executives may slice the space of current and prospective projects multiple ways, allowing for more flexible reporting and portfolio selection. For example, an IT executive could switch between different views showing the current staffing profiles of a set of projects clustered together in a program, while making sure that the current selection of projects may respect the budgetary constraints for a given geographical location.

FIG. 1 illustrates a GUI 10 of an IT project and portfolio management computer software application, presenting project information, in accordance with an embodiment of the present invention.

GUI 10 may be designed to present project information of a specific project from a set of a plurality of projects. GUI 10 may include a project summary section 12, which may include several data fields (e.g., "Project Name", "Project Number", "Project Manager", "Phase", "Region", "Project Type", "Project Status", "Project Health" and "Tags"). In each of the fields the relevant information pertaining to the specific project presented may be displayed (e.g., "Project Name: APO-Pilot", "Project Number: 30632", "Project Manager: John Doe", "Phase: Project", "Region: US", "Project Type: Standard Project (PFM)—Medium", "Project Status: Construct", "Project Health: Yellow" and "Tags: EMEA, EB Strategic"). Tags section 14 may be used to present current tags. Adjacent to project summary section 12 may be presented project health section 14, which may include information on the "health" of the project. In this example, the overall project health is "yellow". Table 16 may display details of specific-health monitoring data for the project (e.g., "Schedule" (yellow), "Issues" (green) and "Cost" (yellow)). The "Exceptions" may indicate the number of health exceptions (5 exceptions for the "schedule" health area).

"Add Tag" button 18 may be provided in GUI 10, which when activated (e.g., pressed, pointed at by a pointing device or otherwise activated), may open a new screen or a pop-up window for entry by a user of a new tag. This new tag entry may appear in tag section 14, along with other tags already present when GUI 10 is displayed again.

A tag may include a symbol, a set of symbols, and/or a character, a set of characters. Each tag may include a textual description, such as an acronym (e.g. EMEA, an acronym used for indicating Europe, Middle East, Africa), a word and/or a phrase. Some form of a descriptive text may be used.

The "Add Tag" button is merely one example of various input mechanisms that may be used according to embodiments of the present invention.

The tagging feature is very useful in reporting by making multiple views available to a user based on one or more selected tags.

FIG. 2 illustrates a graphical user interface (GUI) of an IT project and portfolio management computer software application, presenting portfolio report, in accordance with an embodiment of the invention.

An added degree of freedom may be facilitated by tags representing containment hierarchy. Tags may allow a more flexible clustering of related projects. It may be possible to tag a project with more than one tags. For example, a project may be tagged with a business objective e.g. "regulatory compliance", (see index at the bottom of the figure) while at the same it may also be tagged as "EB Strategic". The overlapped areas of the corresponding circles indicate projects which are tagged both as "regulatory compliance" and "EB strategic".

Figure 3:
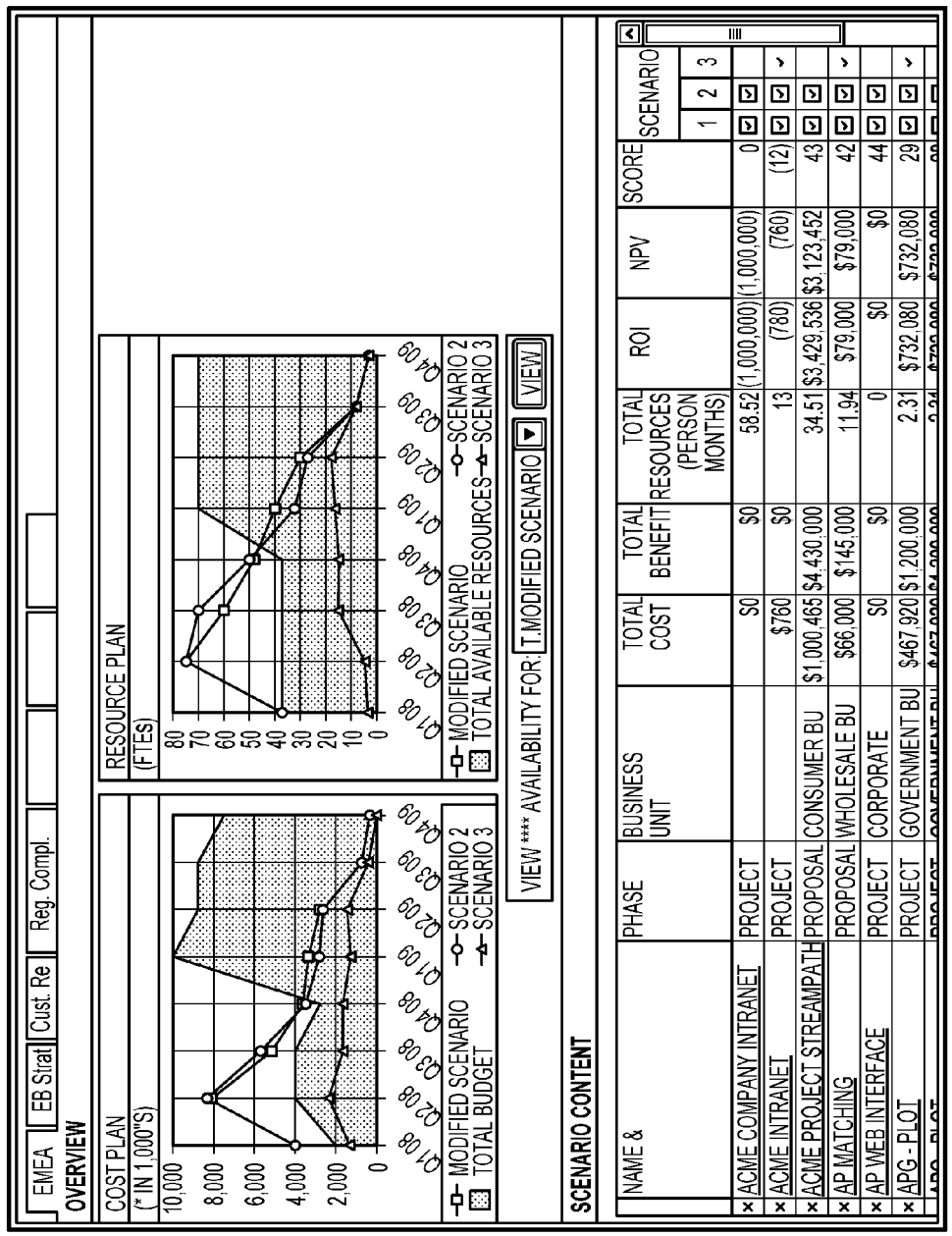
FIG. 3 illustrates a GUI, in accordance with an embodiment of the invention.

FIG. 3 illustrates a graphical user interface (GUI) of an IT project and portfolio management computer software application, presenting selected projects as part of a portfolio, in accordance with an embodiment of the invention. A user may select projects to be part of a portfolio, thus aggregating financial and staffing measures (e.g., total budget and/or total staffing levels, etc.) for a given tag. This aggregation may allow stakeholders, for example, to preventively agree on constraints over such measures for a given tag (for example, a geographical indication, a program and/or a strategic initiative).

Figure 4:
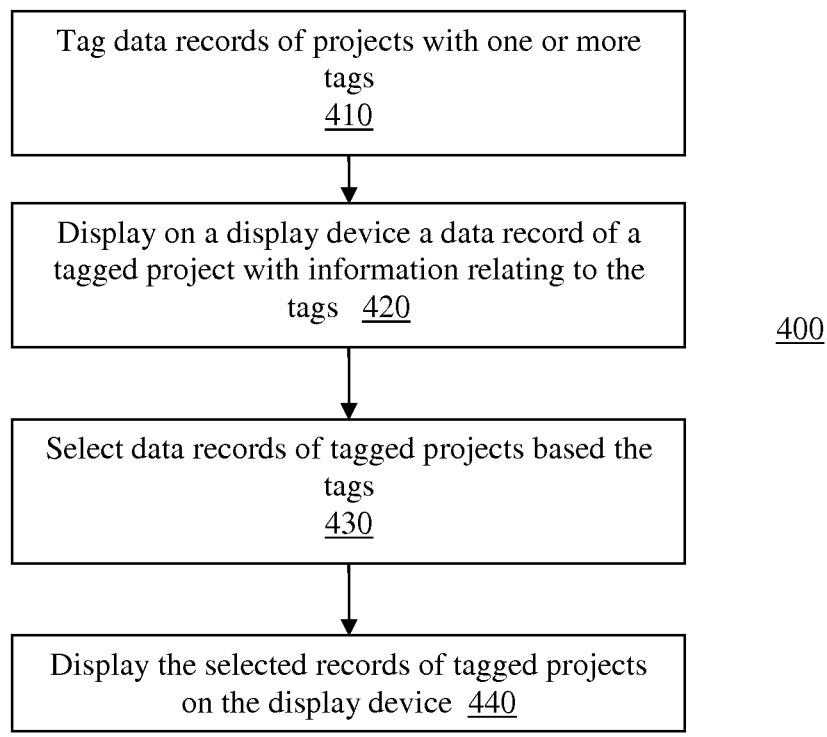
FIG. 4 illustrates a flow chart for a method in accordance with an embodiment of the invention.

FIG. 4 illustrates a flow chart of a method for project and portfolio management in accordance with an embodiment of the invention.

Data records of a project stored in a data base may be tagged, step 410, with one or more tags. Data record of a tagged project may be displayed, step 420, on a display device with the tags (see, for example, FIG. 1 and related explanation). Data records of tagged projects may be selected, step 430, based the tags, and selected records of the tagged projects may be displayed, step 440, on the display device (see, for example, FIG. 2 and related explanation).

Figure 5:
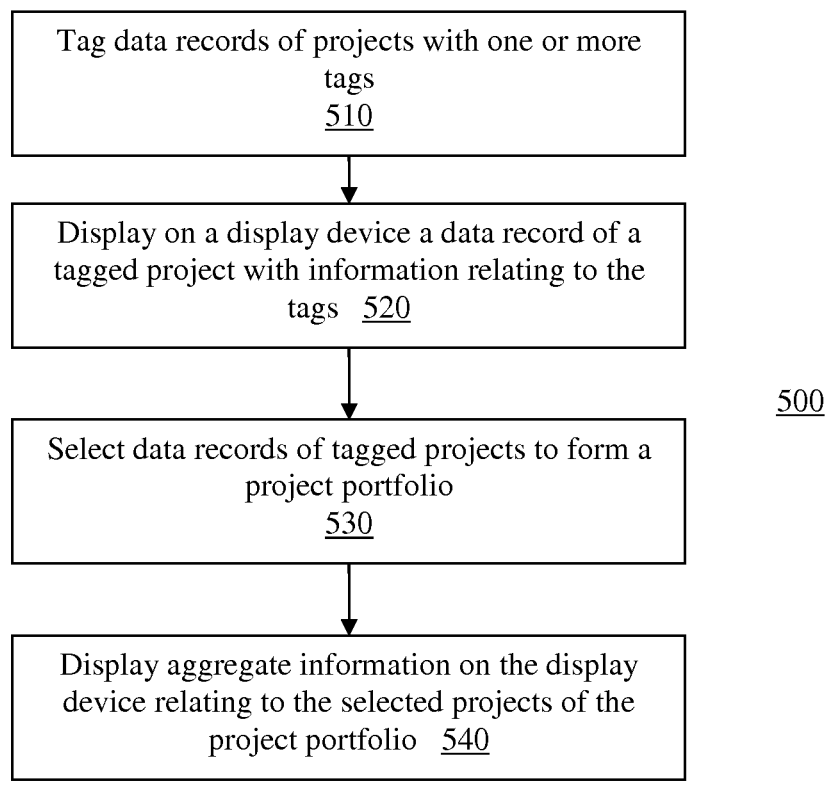
FIG. 5 illustrates a flow chart for a method in accordance with an embodiment of the invention.

FIG. 5 illustrates a process 500 for portfolio management in accordance with an embodiment of the invention.

Data records of projects may be tagged, step 510, with one or more tags. A data record of a tagged project with information relating to the tags may be displayed, step 520, on the display device. Data records of tagged projects may be selected, step 530, to form a project portfolio. Aggregate information may be displayed, step 540, on the display device relating to the selected projects of the project portfolio (see, for example, FIG. 3 and related explanation)

Figure 6:
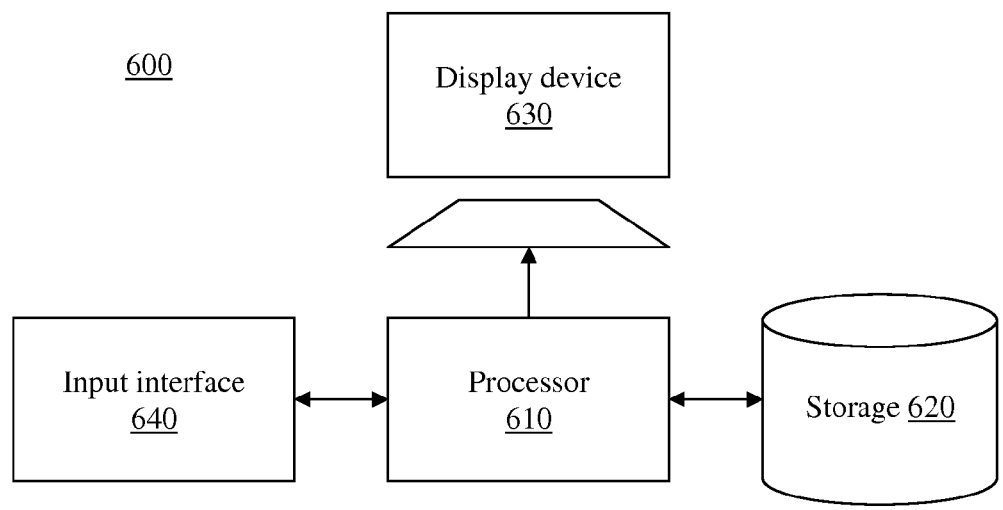
FIG. 6 illustrates a system in accordance with an embodiment of the invention.

FIG. 6 illustrates system 600 for project and portfolio management, in accordance with an embodiment of the invention. System 600 may include a storage medium 620, such as for example a hard disk drive. The system may also include processor 610, an input interface 640, such as, for example, a keyboard, or a touch screen, and a display device 630, such as, for example, a monitor.

The storage medium 620 may be used to store a computer program product (e.g. computer software application) which may include code for performing a method for project and portfolio management, in accordance with one or more of the embodiments of the above described invention.

Aspects of the present invention may be embodied as a computer program product saved on one or more computer-readable mediums in the form of computer-readable program code embodied thereon. For example, the computer-readable medium may be a computer-readable signal medium or a computer-readable non-transitory storage medium. A computer-readable storage medium may be, for example, an electronic, optical, magnetic, electromagnetic, infrared, or semiconductor system, apparatus, or device, or any combination thereof.

A computer-readable signal medium may include a propagated data signal with computer-readable program code embodied therein, for example, in baseband or as part of a carrier wave. Such a propagated signal may take any of a variety of forms, including, but not limited, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Computer program code of the above described embodiments of the invention may be written in any suitable programming language. The program code may execute on a single computer, or on a plurality of computers.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for project and portfolio management, the method comprising:
tagging one or more data records of projects of a plurality of projects with one or more tags, wherein each data record is associated with a cost and a certain geographical location;
selecting a geographical location and a particular tag;
aggregating financial information for data records comprising the particular tag and the certain geographical location associated with the selected geographical location; and
displaying on a display device the aggregated financial information.

2. The method of claim 1, wherein said one or more tags is at least one of a symbol, a set of symbols, a character, a set of characters, a textual description, an acronym, a word, and a phrase.

3. The method of claim 1, comprising selecting data records of tagged projects of said plurality of projects based on one or more of said one or more tags.

4. The method of claim 3, comprising displaying the selected data records on the display device.

5. The method of claim 1, comprising:
selecting data records of projects of said plurality of projects as a part of a project portfolio; and
displaying the aggregated financial information on the display device relating to the selected projects of the project portfolio.

6. The method of claim 5, wherein the aggregated financial information comprises an aggregate value of constrained measures.

7. A non-transitory computer readable medium having stored thereon instructions which when executed by a processor cause the processor to:
tag a data record of one or more projects of a plurality of projects with one or more tags, wherein the data record is associated with a cost and a certain geographical location;
select a geographical location and a particular tag;
aggregate financial information for data records comprising the particular tag and the certain geographical location associated with the selected geographical location; and
display on a display device the aggregated financial information.

8. The medium of claim 7, wherein said one or more tags comprises a tag related to a health status of a project.

9. The medium of claim 7, wherein to display the data record comprises to display two sets of information related to two corresponding tags of the data record.

10. The medium of claim 9, wherein the stored instructions include code to display the data records of the selected projects on the display device.

11. The medium of claim 6, wherein the stored instructions include code to:
select data records of projects of said plurality of projects as a part of a project portfolio; and
display aggregate information on the display device relating to the selected projects of the project portfolio.

12. The medium of claim 11, wherein the aggregate information comprises aggregate value of constrained measures.

13. A system for IP project and portfolio management, the system comprising:
a processor configured to:
tag one or more data records of projects of a plurality of projects with one or more tags, wherein each data record is associated with a cost and a certain geographical location;
select a geographical location and a particular tag;
aggregate financial information for data records comprising the particular tag and the certain geographical location associated with the selected geographical location;
display on a display device the aggregated financial information;
select data records of tagged projects of said plurality of projects based on one or more of said one or more tags and aggregated financial information; and
display the data records of the selected projects on the display device.

14. The system of claim 13, wherein said one or more tags is at least one of a symbol, a set of symbols, a character, a set of characters, a textual description, an acronym, a word, and a phrase.

15. The system of claim 13, wherein the processor is configured to select data records of tagged projects of said plurality of projects based on one or more of said one or more tags.

16. The system of claim 15, wherein the processor is configured to display the data records of the selected projects on the display device.

17. The system of claim 13, wherein the processor is configured to:
select data records of projects of said plurality of projects as a part of a project portfolio; and
display aggregate information on the display device relating to the selected projects of the project portfolio.

18. The system of claim 17, wherein the aggregate information comprises aggregate value of constrained measures.

* * * * *